US006771359B2

United States Patent
Beller

(10) Patent No.: US 6,771,359 B2
(45) Date of Patent: Aug. 3, 2004

(54) FIBER CONNECTION FAULT VISUALIZATION

(75) Inventor: Josef Beller, Tuebingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 101 days.

(21) Appl. No.: 10/094,124

(22) Filed: Mar. 8, 2002

(65) Prior Publication Data

US 2003/0030788 A1 Feb. 13, 2003

(30) Foreign Application Priority Data

Aug. 11, 2001 (EP) .............................................. 01119421

(51) Int. Cl.$^7$ ................................................. G01N 21/00
(52) U.S. Cl. .................................................... 356/73.1
(58) Field of Search .................. 356/73.1, 237.1–237.5, 356/239.1–239.8; 382/141–152, 173, 239, 260–276, 307, 308

(56) References Cited

U.S. PATENT DOCUMENTS

| 5,179,419 A | 1/1993 | Palmquist et al. .......... 356/73.1 |
| 5,809,162 A | 9/1998 | Csipkes et al. ............. 382/108 |
| 6,445,452 B1 * | 9/2002 | Kondou et al. ............. 356/430 |

FOREIGN PATENT DOCUMENTS

JP        07218385        8/1995

* cited by examiner

*Primary Examiner*—Tu T. Nguyen

(57) ABSTRACT

For visualizing faults in an optical fiber connection, imaging signals from the optical fiber connection are received and an image processing of the imaging signals is provided in order to detect faults in the fiber connection. The imaging signals are graphically represented, whereby a visualization of the detected faults is provided by representing such faults in accordance with a predefined coloring scheme.

7 Claims, 1 Drawing Sheet

FIBER CONNECTION FAULT VISUALIZATION

BACKGROUND OF THE INVENTION

The present invention relates to fiber connection testing.

Optical fiber connections are generally very susceptible to contamination with dirt and fluids, scratches, dust and so on, which can cause faults, such as increased insertion loss, higher bit error rate, or signal degradation to the fiber connection and the traffic signal on the fiber. A visual inspection of fiber connectors might therefore be applied. Typically, such visual inspection is carried out using an electronic video microscope consisting of camera unit, monitor, and battery pack. Various devices and methods for surface analysis are disclosed e.g. in U.S. Pat. Nos. 5,809,162, 5,179,419, or JP-A-07 218385.

SUMMARY OF THE INVENTION

It is an object of the present invention to provide an improved visual inspection for fiber connections. The object is solved by the independent claims. Preferred embodiments are shown by the dependent claims.

According to the present invention, imaging signals as provided from an optical fiber connection will be subject to an image processing in order to detect faults in such fiber connection. Such faults can be e.g. scratches, particles such as dirt, fluid films (such as oil films), etc. In a preferred embodiment, pattern recognition is provided in order to detect such faults.

In a next step, the imaging signals will be graphically represented, e.g. on a display, screen, or monitor, whereby a visualization of the detected faults is provided by representing such faults in accordance with a predefined coloring scheme. Preferably, different faults will be represented in different colors. In one embodiment, the imaging signals are provided as mono-color signals (preferably black and white signals) or at least with a limited color or gray scale information. The detected faults are then represented preferably in such colors that are not existing in the original imaging signals.

Thus, the invention provides an improved visual inspection of fiber connections, whereby faults will be readily visualized using a fault-coloring scheme. Preferably, a false-coloring scheme is applied, so that detected faults will be represented in non-real, arbitrary colors.

It is clear that the term "coloring scheme" is not limited to the application for different optical colors (such as red, yellow, or blue) but also covers mono-color shading e.g. in a black and white representation.

The invention can be partly embodied or supported by one or more suitable software programs, which can be stored on or otherwise provided by any kind of data carrier, and which might be executed in or by any suitable data processing unit. Software is preferably employed for processing the imaging signals.

In a preferred embodiment, an optical measuring device for measuring in fiber optic networks comprises a measuring unit for carrying out the measurement, a processing unit for processing measuring data, and a display for visualizing processed measuring results. The optical measuring device further comprises an imaging unit for providing imaging signals preferably for allowing a visual inspection of fiber connections. The imaging unit is adapted to be coupled to the processing unit, which then allows processing the imaging signals so that they can be shown on the display.

The optical measuring device preferably is (or is based on) an optical time domain reflectometer (OTDR), a WDM-tester, a dispersion tester, an optical power-meter, or another test instrument. In a preferred embodiment, the measuring device makes use of already existing functional units, whereby the imaging unit can be coupled thereto by means of interfaces (such as USB). The processing unit will be specifically adapted for providing the image processing and the visualization of the imaging signals to the display. Such adaptation is preferably accomplished by adequate software programs and algorithms, whereby known imaging processing algorithms can be applied.

Instead of the optical measuring device with imaging unit, a conventional electronic video microscope can be used accordingly.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
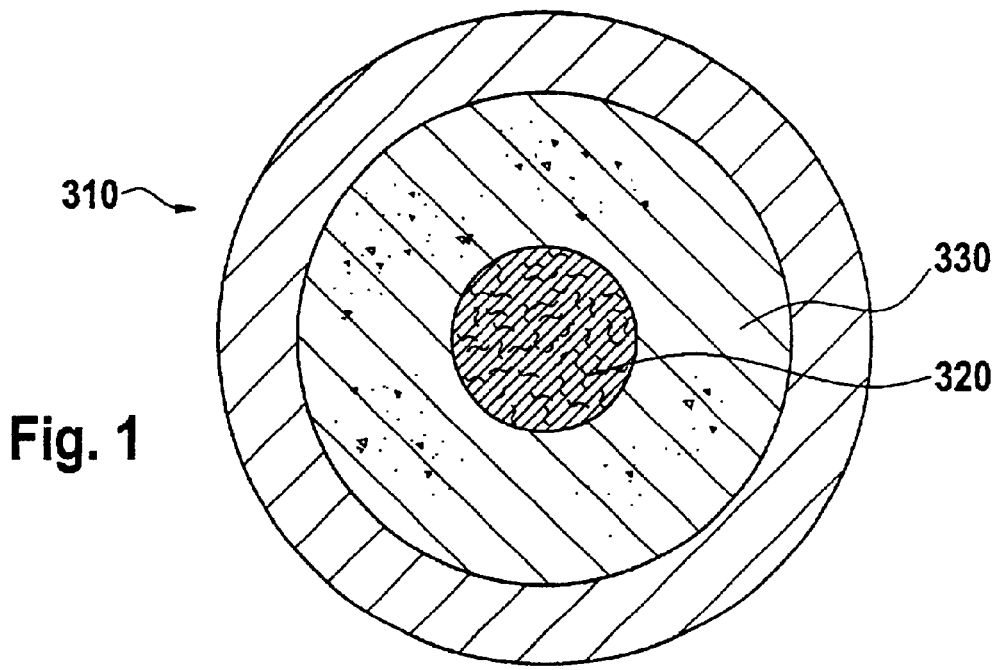
FIG. 1 shows an example of an image 310 as provided from an optical fiber connection.

FIG. 1 shows an example of an image 310 as provided from an optical fiber connection. The image 310 shows the surface of an optical connector with a fiber 320 in the center as a dark spot, and the metal connector ferule 330 surrounding it.

The image 310 will then be subject to image processing in order to detect faults (e.g. scratches, particles such as dirt, fluid films (such as oil films), etc.) in such fiber connection by using pattern recognition. These algorithms can be based e.g. on two-dimensional correlation procedures, or on n×n pixel data transformations, as well known in the art.

Figure 2:
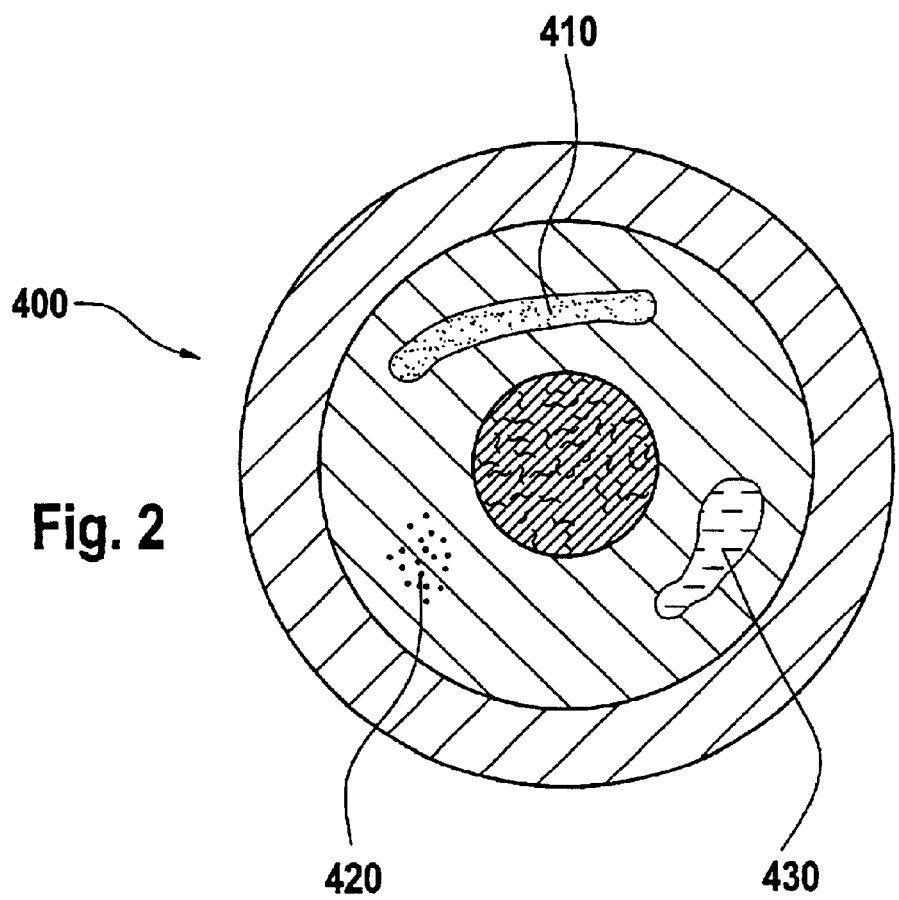
FIG. 2 shows an example of a processed image 400 with a visualization of the detected faults in accordance with the present invention.

FIG. 2 shows an example of a processed image 400 with a visualization of the detected faults. The processed image 400 shows three different kind of connector surface contamination, i.e. scratches 410, particles 420, and fluids 430, each represented using different coloring schemes. In the example of FIG. 2, a gray-scale coloring scheme is used, whereby each detected fault type 410, 420, 430 is represented by a different gray shading. The different faults may also be represented in different colors.

What is claimed is:

1. A method for visualizing faults in an optical fiber connection, comprising:

receiving imaging signals from the optical fiber connection, processing the imaging signals in order to detect faults in the fiber connection, and graphically representing the imaging signals, whereby a visualization of the detected faults is provided by representing such faults in accordance with a predefined coloring scheme, wherein different faults are represented in different colors.

2. The method of claim 1, wherein the detected faults are represented in such colors that are not existing in the original imaging signals.

3. The method of claim 1, wherein faults are any of scratches, particles, dust, smoke, dirt, fluid films, oil films.

4. The method of claim 1, wherein processing the image signals comprises recognizing predefined image patterns in the imaging signals, whereby the predefined image patterns represent potential faults.

5. The method of claim 1, further comprising acquiring imaging signals from the optical fiber connection.

6. A software program or product, stored on a data carrier, for executing a method for visualizing faults in an optical fiber connection, when run on a data processing system such as a computer, said method comprising:

receiving imaging signals from the optical fiber connection, processing the imaging signals in order to detect faults in the fiber connection, and graphically representing the imaging signals, whereby a visualization of the detected faults is provided by representing such faults in accordance with a predefined coloring scheme, wherein different faults are represented in different colors.

7. A system for visualizing faults in an optical fiber connection, comprising:

a receiving device for receiving imaging signals from the optical fiber connection, a processing unit for processing the imaging signals in order to detect faults in the fiber connection, and a visualization unit for graphically representing the imaging signals, whereby a visualization of the detected faults is provided by representing such faults in accordance with a predefined coloring scheme, wherein different faults are represented in different colors.

* * * * *